United States Patent [19]

Newsock et al.

[11] 3,841,452

[45] Oct. 15, 1974

[54] FRICTION PLATE ASSEMBLY

[75] Inventors: Roger L. Newsock, Centerville; Warren W. Antrim, Dayton, both of Ohio

[73] Assignee: General Motors Corporation, Detroit, Mich.

[22] Filed: July 26, 1973

[21] Appl. No.: 382,676

[52] U.S. Cl. ......... 192/107 R, 192/70.2, 192/106.1, 192/107 C, 192/109 B, 188/218 XL, 188/73.2
[51] Int. Cl. ............................................. F16d 13/60
[58] Field of Search ....... 192/107 R, 107 M, 107 C, 192/109 A, 109 B, 115, 106.1, 70.2; 188/218 XL, 73.2

[56] References Cited
UNITED STATES PATENTS

| | | | |
|---|---|---|---|
| 2,850,118 | 9/1958 | Byers | 192/107 R X |
| 2,899,038 | 8/1959 | Wellauer | 192/109 X |
| 3,376,960 | 4/1968 | Bender | 192/107 R |
| 3,473,637 | 10/1969 | Rutt | 192/107 R |
| 3,631,953 | 1/1972 | Snoy et al. | 192/106.1 X |
| 3,760,921 | 9/1973 | Gillespie | 192/107 R |

Primary Examiner—Samuel Scott
Assistant Examiner—Lance W. Chandler
Attorney, Agent, or Firm—Charles R. White

[57] ABSTRACT

A friction unit comprising a first series of plates faced with friction material interleaved with steel plates is selectively engaged by a hydraulically operated piston. Each of the faced plates is an assembly formed from matching discs of matted fibrous cellulosic material and is supported by a hooped one-piece wire carrier. The wire carrier is partially embedded between the discs and has radially extending portions which mesh with the splines of a support.

3 Claims, 3 Drawing Figures

PATENTED OCT 15 1974　　3,841,452

FRICTION PLATE ASSEMBLY

This invention relates to clutch and brake plates faced with friction material and more particularly to a friction plate assembly having friction disc means supported by a one-piece wire carrier which is partially embedded in the friction disc means and which has radially extending arms adapted to mesh with the splines of a support.

Multi-plate friction clutch and brake units for power transmissions usually comprise a plurality of steel plates interleaved with friction plates faced with matted cellulosic material that are selectively engaged by a hydraulically actuated piston means to provide for clutching or braking functions. The conventional friction plate assembly generally comprises a steel disclike core or carrier to support discs or rings of friction material bonded on either side of the carrier. The carrier provides for the full backing of the discs of friction material and is formed with peripheral teeth which engage splines on a shaft or other support.

In some main clutch constructions used with manual transmissions, a plurality of separate wire carriers have been employed to support a friction disc and to dampen torsional vibrations. Such constructions however require special splined hubs mounting the wire carriers which are complex and bulky and are not suitable for use in multi-plate friction units.

In this invention a new and improved friction plate assembly is provided which incorporates a special wire carrier that provides for the backing of discs of friction material and the connection with a splined support. Preferably the carrier is formed from spring steel wire rectilinear in cross section and cut to a predetermined length. After cutting, the wire is formed with a symmetrical rectangular wave pattern, hooped into a circle and the free ends are butt welded together. After being hooped and welded, first radially extending arms of the carrier are embedded within the matted fibrous material of the clutch discs and second radially extending arms provide a splined connection within a support member.

This invention eliminates the full backing of the friction discs of prior constructions and provides for a light weight friction plate assembly and the new and improved splined connection with a support.

It is a feature, object and advantage of this invention to provide a new and improved friction plate assembly for use in a multi-plate friction clutch or brake comprising a one-piece wire carrier which is hooped into a circle and partially embedded into friction disc means and which has radially extending parts that provide teeth for a slidable splined connection with a support member.

Another feature, object and advantage of this invention is to provide a friction unit incorporating new and improved friction plates each having a one-piece wire carrier having a first radial portion embedded into a disc of friction material and a second radial portion providing a slidable splined connection with a splined support.

Another feature, object and advantage of this invention is to provide a new and improved friction plate assembly for use in multi-plate clutches and brakes which incorporates a one-piece wire carrier secured within the material of the friction disc of the assembly and which has radially extending wire arms which are evenly spaced and which mesh with the splines of a support.

Another feature, object and advantage of this invention is to provide a lightweight friction plate assembly for use in multi-plate clutches and brakes which provides substantial savings in material and labor with a new and improved one-piece wire carrier used for the backing and the support of friction disc means.

These and other objects and features of this invention will be more apparent from the following detailed description and drawing wherein.

Figure 1:
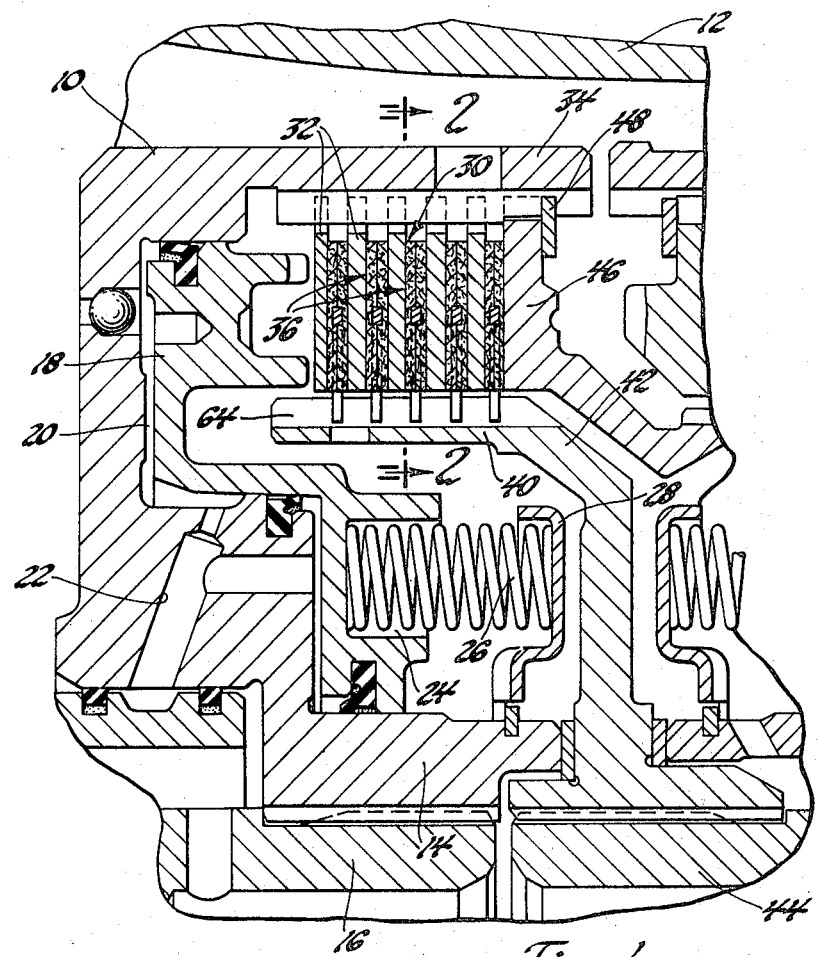
FIG. 1 is a sectional view of a portion of a transmission.

Turning now in more detail to the drawing, there is shown in FIG. 1 a portion of a transmission which incorporates a drum 10 mounted for rotation within transmission case 12. This drum has an inner hub 14 splined to a centrally located turbine-driven shaft 16 and houses a hydraulically operated piston 18 that cooperates with the drum 10 to form a pressure chamber 20. Pressure chamber 20 is operatively connected to hydraulic controls, not shown, by a fluid conducting passage 22. Piston 18 has a plurality of equally spaced cylindrical pockets 24 for helical return springs 26 each of which having one end disposed in a pocket 24 and the other end seated against the inner face of an annular retainer plate 28 secured to the inner wall of hub 14 of drum 10.

Drum 10 houses a multi-plate friction pack 30 disposed immediately behind piston 18 which comprises flat annular steel plates 32 splined to the inside of cylindrical wall 34 of the drum 10 interleaved with annular friction plate assemblies 36. As shown, these plate assemblies are splined to the outer cylindrical wall 40 of a drum-like plate support 42 which in turn is splined to an intermediate shaft 44 extending longitudinally in the transmission. Disposed immediately back of the last friction plate assembly 36 is a backing plate 46 for the clutch pack which is splined to the inside of wall 34 and which is secured in position by a snap ring 48.

Figure 2:
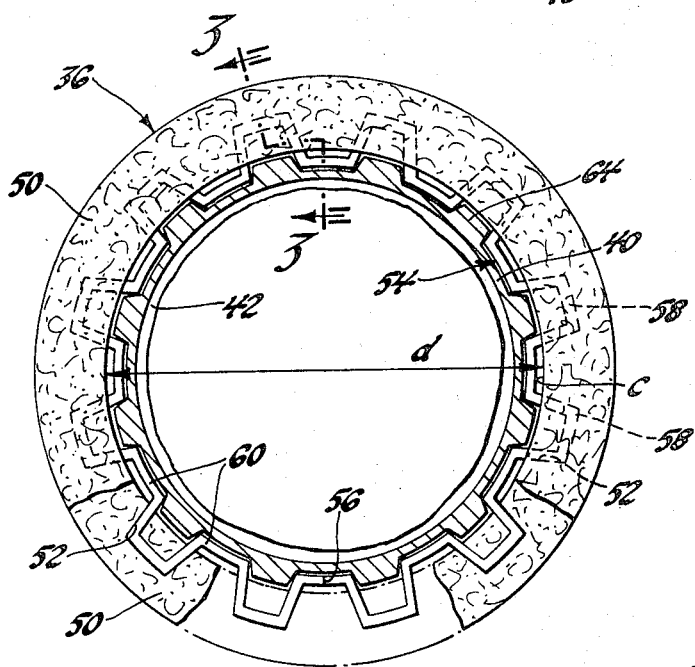
FIG. 2 is a view taken along the line 2—2 of FIG. 1.
Figure 3:
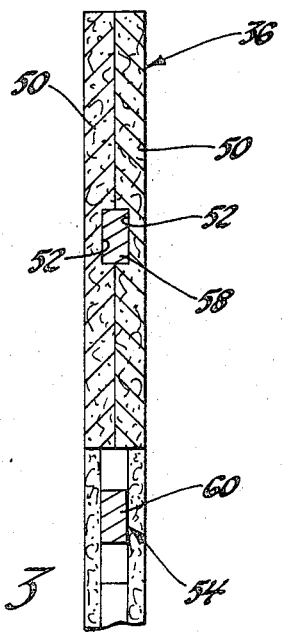
FIG. 3 is a view taken along lines 3—3 of FIG. 2.

Each friction plate assembly 36 comprises a pair of wafer-like rings or discs 50 made from matted, resin-impregnated, fibrous, cellulose material. Each disc is formed with a series of evenly spaced generally U-shaped grooves 52 formed in one face thereof. A one-piece, serpentined wire carrier 54 hooped into a circular configuration provides the backing and the support for each pair of friction discs 50. To make the carrier, strip stock is cut to a predetermined length and formed into a symmetrical rectangular wave. The wave is hooped into a circular configuration and the free ends are butt welded together as at 56. The carrier as formed thus has a plurality of evenly spaced projecting portions or arms 58 which extend radially outwardly from a base circle c having a diameter d and a plurality of evenly spaced projecting portions or arms 60 alternately disposed with respect to portions 58 which extend radially inwardly from the base circle c. The wire carrier 54 is installed onto one of the friction discs 50 so that the radially extending projecting portions 58 fit in the U-shaped grooves 52 and a second friction disc 50 is bonded or otherwise secured to the first friction ring in a back-to-back relationship as shown in FIG. 3. After the friction discs are securely bonded together, the friction plate assemblies are interleaved with the steel plates 32 to form the friction pack 30. As shown best in FIGS. 1 and 2, the inwardly extending projecting portions 60 engage the flanks and slidably fit between the splines 64 of the drum-like plate support 42 to provide a splined, driving connection between these parts.

In operation when apply chamber 20 is pressurized, the piston 18 strokes in the bore to effect the torque-transmitting frictional engagement of the multi-plate friction pack 30. Since the friction discs 50 have high strength and load carrying capacity, torque will be transmitted through the wire carrier to the intermediate shaft 44. When pressure is relieved from chamber 20, the return springs 26 stroke the piston 18 to the off position to effect the disengagement of friction pack 30 so that no torque is transmitted through the friction pack.

While the friction plate assemblies of this invention have been described as being made from a pair of cellulosic friction discs bonded together to embed and secure a one piece wire carrier having rectangular waves thereto, other similar constructions can be readily manufactured. Thus the carrier can be formed from circular wire stock into a ring with sinusoidal waves. The carrier can be embedded into any suitable fibrous material of a single friction disc when spongy or soft before it is cured. When the friction ring is cured, the discs harden to securely attach the carrier to the disc to form the complete assembly.

While a preferred embodiment and method of making this invention have been shown and described, other modifications and methods of manufacture will now be apparent to those skilled in the art. Accordingly, this invention is not to be limited to any particular method shown and described for illustrative purposes only, but only by the following claims.

I claim:

1. A friction plate assembly for torque transmitting connection with a splined support comprising annular disc means of friction material, carrier means disposed radially with respect to said disc means for operatively connecting friction disc means to said splined support, said carrier means comprising a one-piece wire having a plurality of evenly spaced waves therein, said wire having a plurality of evenly spaced arms formed by predetermined waves in said wire which extend radially in a first direction into the friction material of said disc means, means for securing said first arms to said friction disc means, said wire further having a plurality of evenly spaced arms formed by other predetermined waves in said wire which extend radially in a second direction and into meshing engagement with the splines of the support.

2. A friction plate assembly for a clutch or brake unit comprising a support having a plurality of splines thereon, annular disc means of fibrous friction material, a carrier for said disc means, said carrier comprising a circular one-piece wire having a first series of identical and equally spaced arm means which extend in a first radial direction into the material of said disc means, means securing said first series of spaced arm means in the friction material of said disc means, said one-piece wire further having a second series of identical and equally spaced arm means alternately disposed with respect to said first series of arm means which extend in an opposite radial direction out of said disc means and into meshing engagement with said splines of said support.

3. A multi-plate friction unit for a power transmission comprising separate first and second relatively rotatable supports radially spaced from one another, said supports being formed with longitudinally extending splines which face each other, a first series of plate means splined to said first support, a second series of plate means interleaved with said first series of plate means splined to said second support, each plate of said second series of plate means comprising an annular disc of friction material and a corresponding carrier operatively connecting said disc to said second support, each said carrier comprising a continuous circular wire, each said wire having a first series of evenly spaced arms radially extending in a first direction and securely embedded into the friction material of a corresponding disc of said second series of plate means, each said wire further having a second series of evenly spaced arms which radially extend in a second direction and into meshing engagement with the splines of said second support to form a splined connection therewith, and motor means for applying a load to said first and second series of plate means to effect the selective engagement of said multi-plate friction unit and the driving connection of said first and second supports.

* * * * *